United States Patent Office 3,256,318
Patented June 14, 1966

3,256,318
AMINO ESTERS OF AROMATIC POLY-
CARBOXYLIC ACIDS
Thomas K. Brotherton, South Charleston, and John W.
Lynn, Charleston, W. Va., assignors to Union Carbide
Corporation, a corporation of New York
No Drawing. Filed May 1, 1962, Ser. No. 191,440
15 Claims. (Cl. 260—475)

This invention relates, in general, to novel diamines and to a process for their preparation. In one aspect, this invention relates to a new class of esters of aromatic polycarboxylic acids having at least two primary amino groups and novel salts thereof.

The novel compounds of this invention can be conveniently represented by the following general formula:

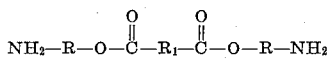

wherein R represents a member selected from the group consisting of divalent substituted and unsubstituted aliphatic and alicyclic groups; and $R_1$ represents a divalent group containing at least one aromatic group. Preferred compounds are those wherein R represents a divalent group containing from 2 to 12 carbon atoms and $R_1$ represents an aromatic group containing from 6 to 18 carbon atoms. Particularly preferred compounds represented by the aforesaid formula are those wherein R represents a member selected from the group consisting of alkylene, alkenylene, alkynylene, cycloalkylene, cycloalkenylene, alkycycloalkylene, alkylcycloalkenylene, cycloalkylenealkylene, and cycloalkenylenealkylene groups containing from 2 to 12 carbon atoms and $R_1$ represents a member selected from the group consisting of arylene, arylenealkylene, alkylenearylene, alkylenearylenealkylene and alkarylene groups containing from 6 to 18 carbon atoms.

Additionally, the present invention encompasses the diamine salts of the aforementioned novel compounds having the formula:

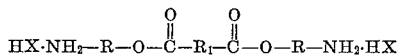

wherein R and $R_1$ have the same value as previously defined and HX represents hydrogen chloride, hydrogen bromide, or mineral acids such as sulfuric, phosphoric, and the like.

Illustrative compounds encompassed by the present invention include, among others, bis(2-aminoethyl) phthalate,
bis(2-aminoethyl) terephthalate,
bis(2-aminoethyl) isophthalate,
bis(2-aminoethyl) p-phenylenediacetate,
bis(2-aminoethyl) 2,7-naphthalenediacetate,
bis(2-aminoethyl) o-methyl-p-phenylenediacetate,
bis(9-aminononyl) terephthalate,
bis(12-aminododecyl) p-phenylenediacetate,
bis(2-aminocyclohexyl) phthalate,
bis(4-amino-2-butenyl) terephthalate, and the like, and the corresponding salts thereof.

The term "substituted" as used throughout the specification and appended claims is meant to further define the novel compositions of matter to include those wherein the aforementioned R groups can be aliphatic with alicyclic substituents, or alicyclic with aliphatic substituents, in addition to other groups hereinafter indicated.

The novel compounds of this invention are multifunctional in that each compound contains at least two primary amino groups in the molecule. Due to the presence of the amino groups, the novel compounds of this invention are useful as curing agents for epoxy resins, and as intermediates for the preparation of numerous chemical compounds. In particular, the compositions of this invention are useful in the preparation of novel diisocyanate esters of polycarboxylic acids and related compounds.

It is accordingly an object of the present invention to provide novel diamines and salts thereof which are suitable for use in the plastic and resin field. Another object is to provide novel compositions of matter comprising the amino esters of aromatic polycarboxylic acids and novel salts thereof. A further object of the present invention is to provide new compositions of matter comprising the bis(aminoalkyl) esters of aromatic polycarboxylic acids; and the bis(aminocycloalkyl) esters of aromatic polycarboxylic acids. Another object of this invention is to provide novel esters containing at least two primary amino groups. A still further object of the present invention is to provide novel compounds having polyfunctional properties. Another object of the present invention is to provide a novel process for the preparation of the aforesaid novel compositions, these and other objects will readily become apparent to those skilled in the art in the light of the teachings herein set forth.

In its broad aspect, this invention is directed to novel amino esters of aromatic polycarboxylic acids, novel salts thereof, and a process for their preparation. These novel composition are multi-functional in nature in that each compound is characterized by the presence of at least two primary amino group which are available for reaction.

In one embodiment of the present invention the novel ester diamines can be represented by the aforesaid general formula wherein each R represents a substituted or unsubstituted divalent aliphatic group. Preferred compound within this embodiment are those represented by the class formula:

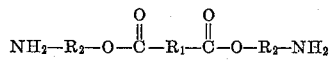

wherein $R_2$ represents a divalent substituted or unsubstituted aliphatic group containing from 2 to 12 carbon atoms and $R_1$ represents a divalent group of from 6 to 18 carbon atoms and which contains at least one aromatic group. Particularly preferred compounds within this embodiment are those wherein $R_2$ is a member selected from the group consisting of alkylene, alkenylene, alkynylene, cycloalkylalkylene, and cycloalkenylalkylene groups containing from 2 to 10 carbon atoms and $R_1$ has the same value as previously indicated. The divalent $R_2$ group can be either straight or branched chain and need not be the same throughout the molecule.

The novel compounds of this embodiment of the instant invention can be illustrated by the following ester diamines:

bis(2-aminoethyl) phthalate,
bis(3-aminopropyl) terephthalate,
bis(4-aminobutyl) isophthalate,
bis(5-aminopentyl) p-phenylenediacetate,
bis(7-aminoheptyl) p-phenylenedipropionate,
bis(8-aminooctyl) 2,7-naphthalenediacetate,
bis(9-aminononyl) o-methyl-p-phenylenediacetate,
bis(10-aminodecyl) o-propyl-p-phenylenediacetate,
bis(2-methyl-3-aminopropyl) p-phenylenediacetate,
bis(2,2-dimethyl-3-aminopropyl) phthalate,
bis(3-ethyl-5-aminopentyl) 2,7-naphthalenediacetate,
bis(3,4-diethyl-5-aminopentyl) terephthalate,
bis(4,4-dimethyl-6-aminohexyl) o-methyl-p-phenylenediacetate,
bis(2-methyl-4-ethyl-6-aminohexyl) isophthalate, bis(9-aminononyl) o-propyl-p-phenylenediacetate,
bis(5,6,7-triethyl-9-aminononyl) p-phenylenediacetate,
2-aminoethyl-3-aminopropyl p-phenylenedipropionate,
4-aminobutyl 6-aminohexyl phthalate,
3-aminopropyl 8-aminooctyl 2,7-naphthalenediacetate,
5-aminopentyl 6-aminohexyl terephthalate,
2-methyl-3-aminopropyl 3-aminoethyl o-methyl-p-phenylenediacetate,
4-ethyl-7-aminoheptyl 6-aminohexyl isophthalate,
bis(4-amino-2-butenyl) p-phenylenedipropionate,
bis(4-amino-2-butenyl) phthalate,
bis(5-amino-3-pentenyl) 2,7-naphthalenediacetate,
bis(7-amino-4-heptenyl) terephthalate,
bis(8-amino-4-octenyl) o-methyl-p-phenylenediacetate,
bis(9-amino-5-nonenyl) isophthalate,
bis(10-amino-6-decenyl) o-propyl-p-phenylenediacetate,
bis(3-ethyl-5-amino-3-pentenyl) p-phenylenediacetate,
bis(3,4-dimethyl-5-amino-3-pentenyl) p-phenylenedipropionate,
bis(2-methyl-4-ethyl-6-amino-2-hexenyl) phthalate,
bis(5,6,7-triethyl-9-amino-4-nonenyl) 2,7-naphthalenediacetate,
4-amino-2-butenyl 3-aminopropyl terephthalate,
4-amino-2-butenyl 5-amino-3-pentenyl o-methyl-p-phenylenediacetate,
4-ethyl-7-amino-5-heptenyl-6-amino-3-hexenyl isophthalate,
bis(5-amino-2-butynyl) o-methyl-p-phenylenediacetate,
bis(7-amino-4-heptynyl) isophthalate,
bis(10-amino-4-decynyl) o-propyl-p-phenylenediacetate,
bis(9-amino-5-nonynyl) p-phenylenediacetate,
bis(2-cyclohexyl-3-aminopropyl) p-phenylenediacetate,
bis(3-cyclohexyl-5-aminophenyl) p-phenylenedipropionate,
bis(4-cyclohexyl-6-aminohexyl) phthalate,
bis(5-cyclohexylmethyl-7-aminoheptyl) 2,7-naphthalenediacetate,
bis(3-cycloheptyl-5-aminopentyl) terephthalate,
bis(3-cyclohexenyl-5-aminopentyl) o-methyl-p-phenylenediacetate,
bis(5-cycloheptenylmethyl-8-aminooctyl) isophthalate,
and the like.

In a second embodiment of the present invention, the novel ester diamines can be represented by the aforementioned general formula wherein each R represents a divalent cycloaliphatic group and which need not be the same throughout the molecule and $R_1$ has the same value as previously indicated. Preferred compounds within this embodiment are those represented by the class formula:

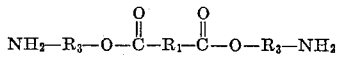

wherein $R_3$ represents a divalent substituted or unsubstituted cycloaliphatic group containing from 4 to 12 carbon atoms and $R_1$ has the same value as previously indicated. Particularly preferred compounds within this embodiment are those wherein $R_3$ is a member selected from the group consisting of cycloalkylene, cycloalkenylene, alkylcycloalkylene, alkylcycloalkenylene, alkylenecycloalkylene, and cycloalkylenealkylene groups containing from 4 to 10 carbon atoms and $R_1$ is as previously indicated. The divalent cycloaliphatic group need not be the same throughout the molecule.

Illustrative novel ester diamines encompassed by this embodiment of the present invention include, among others, the following:

bis(2-aminocyclobutyl) p-phenylenedipropionate,
bis(3-aminocyclopentyl) phthalate,
bis(4-aminocyclohexyl) 2,7-naphthalenediacetate,
bis(5-aminocycloheptyl) terephthalate,
bis(6-aminocyclooctyl) o-methyl-p-phenylenediacetate,
bis(7-aminocyclononyl) isophthalate,
bis(3-amino-4-cyclopentenyl) p-phenylenediacetate,
bis(4-amino-5-cyclohexenyl) p-phenylenedipropionate,
bis(5-amino-6-cycloheptenyl) phthalate,
bis(6-amino-7-cyclooctenyl) 2,7-naphthalenediacetate,
bis(2-aminocyclobutylmethyl) isophthalate,
bis(2-amino-2-ethylcyclobutyl) o-propyl-p-phenylenediacetate,
bis[2(2'-aminoethyl)cyclobutyl]p-phenylenediacetate,
bis(3-aminocyclopentylmethyl) p-phenylenedipropionate,
bis(3-amino-2-ethylcyclopentyl) phthalate,
bis[3(2'-aminoethyl)cyclopentyl] terephthalate,
bis(5-aminocycloheptylmethyl) o-methyl-p-phenylenediacetate,
bis(3-amino-5-methylcyclohexyl) isophthalate,
bis(3-amino-5,6-dimethylcyclohexyl) o-propyl-p-phenylenediacetate,
bis(3-amino-4-ethylcyclopentyl) p-phenylenediacetate,
bis(3-amino-4,5-diethylcyclopentyl) p-phenylenedipropionate,
bis(4-amino-5-methyl-2-cyclohexenyl) phthalate,
and the like.

Although the preferred ester diamines of this invention contain no elements other than carbon, hydrogen, oxygen and nitrogen, the molecule can be substituted with various organic and inorganic radicals containing such groups as ether, sulfide, polysulfide, sulfone, sulfoxide, ester, nitro, nitrile, carbonate, and various metal groups.

In accordance with the process of this invention, the novel diamines and salts of the aforementioned embodiments can be produced in relatively high yields by the reaction of the hydroxy amine salt, contained in an inert, normally liquid reaction medium with a polycarboxylic acid halide at a temperature which does not exceed the temperature at which the salt dissociates, and thereafter recovering the ester diamine dihydrohalide product.

In general, there are several factors which are critical to the successful preparation of the instant compounds. Firstly, it is necessary that the amino group of the hydroxy amine be eliminated as a reaction site in order to obtain exclusive reaction of the hydroxyl groups with the polycarboxylic acid halide. Secondly, the particular products obtained from the reaction of salts of hydroxy amines and acid halides are critically dependent upon the reaction temperature employed.

In practice, it has been found that the amino groups of the hydroxy amine starting material as well as the resulting ester diamine, can be successfully shielded as a reaction site by the formation of the hydroxy amine salt prior to the reaction with the acid halide. The salt, preferably the hydrochloride, can be formed and subsequently isolated prior to use, or employed directly without isolation. In the latter instance, solvents should be used which will remain inert during the reaction with the acid halide. When the hydroxyl amine salt is not to be isolated, it is usually necessary to conduct the neutralization in the solvent with gaseous hydrogen chloride at elevated temperatures in order to obtain a salt of satisfactory purity. When the hydroxy amine salt is to be isolated, it is preferred to effect neutralization in a solvent in which the hydroxy amine is soluble, such as, for example, chloroform, dimethyl ether of ethylene glycol, tetrahydrofuran, dioxane and the like. In such circumstances, neutralization can be satisfactorily conducted at room temperature.

The reatcion of the hydroxy amine salt and acid halide is preferably conducted within the temperature range of from about 65° C. to about 150° C. At a reaction temperature below 65° C., substantially all the starting material was recovered. The preferred operating temperature range was from about 65° C. to 95° C. wherein optimum yield of the ester diamine dihydrohalide was recovered. In general, the temperature necessary to produce the ester diamine dihydrohalide will be dependent upon both the melting point and the basicity of the particular hydroxy amine starting material. In actual practice, it has been found that the optimum yield will be obtained at a temperature which does not exceed the temperature at which the particular hydroxy amine hydrohalide would dissociate to the free amine under the conditions employed. Thus, while the reaction is critically dependent upon the reaction temperature, the actual temperature employed will not necessarily be the same for each starting material. As a general rule, however, the reaction temperature will usually fall within the range of from about 35° to about 150° C.

Pressure is not necessarily critical and the instant process can be conducted at atmospheric, subatmospheric or superatmospheric pressures, although the reaction of monoethanolamine hydrochloride and the aromatic acid halide under pressures of up to 150 pounds per square inch and at temperatures of from about 65° C. to about 150° C., as a rule, gave lower yields of the diamine than the corresponding reactions at atmospheric pressure.

In general, the process of the present invention, the conversion of the hydroxy amine salt to the corresponding ester diamine dihydrohalide is accomplished in an inert, normally liquid reaction medium, at the aforementioned reaction temperature. The liquid reaction medium employed in the conversion of the hydroxy amine salt to the corresponding novel ester diamine dihydrohalide must be inert to the reactants and stable under the conditions employed. Moreover, it should be easily separable from the resulting ester diamine dihydrohalide. Typical inert, liquid solvents which have been found suitable for utilization as media in the process of the present invention include, among others, aromatic hydrocarbons such as toluene, xylene, naphthalene, tetrahydronaphthalene, benzene, diphenyl, cymene, amylbenzene; cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobutyl ketone, methylhexyl ketone, diisopropyl ketone and other solvents such as tetramethylene sulfone, and the like.

Although the process of the instant invention preferably is conducted with aromatic polycarboxylic acid polychlorides in its broadest concept the process includes the utilization of any polycarboxylic acid polyhalide such as the difluoride or dibromide. However, for economic considerations the acid chloride is the preferred reactant.

Inasmuch as the yield and rate of formation of diamine are dependent upon several variables, for example, concentration of the hydroxy amine salt, solubility of the amine salt and acid halide in the reaction medium, reaction temperature, pressure and rate of addition of the acid halide, no hard and fast rule can be devised regarding the optimum conditions to be employed.

In a preferred embodiment of the process of the instant invention a toluene solution containing the hydroxy amine in a concentration of from about 10 to about 40 weight percent is saturated with gaseous hydrogen chloride. Thereafter, the aromatic polycarboxylic acid chloride is added over a period of approximately 60 minutes which the temperature of the mixture is raised from about 65° C. to 150° C. After removal of by-product hydrogen chloride and the solvent, a crude ester diamine dihydrochloride is obtained which can be recovered by filtration and refined by known purification techniques such as washing and the like. The free ester diamine can be obtained by basification of the corresponding dihydrohalide.

In practice, it has been found that the mole ratio of acid halide to hydroxy amine salt in the initial reaction medium should be approximately 1:1 although a slight excess of acid halide is preferred.

Although the reaction of the hydroxy amine salt in an inert, normally liquid reaction medium in the absence of a hydrogen chloride acceptor is the most economically attractive process, the use of tertiary amines having basic strengths somewhat less than the hydroxy amine as acceptors for the by-product halide often result in time and temperature advantages over the direct process.

The starting materials for the production of the novel diamines and salts of the present invention, as hereinbefore indicated, are the corresponding salts of hydroxy compounds having primary amino groups and polycarboxylic acid halides. The hydroxy amine salts can be conveniently represented by the following general formula:

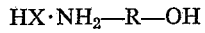

wherein R has the same value as previously indicated and HX represents hydrogen chloride, hydrogen bromide, or mineral acids such as sulfuric, phosphoric, and the like. Other acid salts can also be utilized but hydrochloric acid is preferred.

Suitable starting hydroxy amine salts for the novel compositions of the first embodiment of this invention include the salts represented by the class formula:

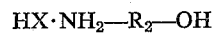

wherein $R_2$ and HX are as previously defined. Illustrative starting compounds include the hydrohalide salts of the following primary amino alcohols: 2-aminoethyl alcohol, 3 - aminopropyl alcohol, 4 - aminobutyl alcohol, 5-aminopentyl alcohol, 7-aminoheptyl alcohol, 8-aminooctyl alcohol, 9-aminononyl alcohol, 10-aminodecyl alcohol, 2-methyl-3-aminopropyl alcohol, 2,2-dimethyl - 3 - aminopropyl alcohol, 3 - ethyl - 5 - aminopentyl alcohol, 3,4 - diethyl - 5 - aminopentyl alcohol, 4,4 - dimethyl - 6 - aminohexyl alcohol, 2 - methyl - 4 - ethyl - 6 - aminohexyl alcohol, 9 - aminononyl alcohol, 5,6,7 - triethyl - 9 - aminononyl alcohol, 4 - amino - 2 - butenyl alcohol, 4 - amino - 2 - butenyl alcohol, 5 - amino - 3 - pentenyl alcohol, 7 - amino - 4 - heptenyl alcohol, 8 - amino - 4 - octenyl alcohol, 9 - amino - 5 - nonenyl alcohol, 10 - amino - 6 - decenyl alcohol, 3 - ethyl - 5 - amino - 3 - pentenyl alcohol, 3,4 - dimethyl - 5 - amino - 3 - pentenyl alcohol, 2 - methyl - 4 - ethyl - 6 - amino - 2 - hexenyl alcohol, 5,6,7 - triethyl - 9 - amino - 4 - nonenyl alcohol, 5 - amino - 2 - butynyl alcohol, 7 - amino - 4 - decynyl alcohol, 9 - amino - 5 - nonynyl alcohol, 2 - cyclohexyl - 3 - aminopropyl alcohol, 3 - cyclohexyl - 5 - aminopentyl alcohol, 4-cyclohexyl - 6 - aminohexyl alcohol, 5 - cyclohexylmethyl - 7 - aminoheptyl alcohol, 3 - cycloheptyl - 5 - aminopentyl alcohol, 3 - cyclohexenyl - 5 - aminopentyl alcohol, 5 - cycloheptenylmethyl - 8 - aminooctyl alcohol, and the like.

The hydroxy amine salts which can be used for the preparation of the novel compositions of the second embodiment of this invention can be represented by the following class formula:

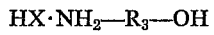

wherein $R_3$ and HX are as previously defined. Illustrative starting materials include the hydrohalide salts of the following: 2-aminocyclobutyl alcohol, 3-aminocyclopentyl alcohol, 4 - aminocyclohexyl alcohol, 5-amino cycloheptyl alcohol, 6 - aminocyclooctyl alcohol, 7-aminocyclononyl alcohol, 3 - amino - 4 - cyclopentenyl alcohol, 2 - aminocyclobutylmethyl alcohol, 2-amino - 6 - cycloheptenyl alcohol, 6 - amino - 7 - cyclooctenyl alcohol, 2 - aminocyclomutylmethyl alcohol, 2-amino - 2 - ethylcyclobutyl alcohol, 2(2' - aminoethyl)cyclobutyl alcohol, 3 - aminocyclopentylmethyl alcohol, 3-amino - 2 - ethylcyclopentyl alcohol, 3(2' - aminoethyl)cyclopentyl alcohol, 5 - aminocycloheptylmethyl alcohol, 3 - amino - 5 - methylcyclohexyl alcohol, 3-amino - 5,6 - dimethylcyclohexyl alcohols, 3 - amino - 4 - ethylcyclopentyl alcohol, 3 - amino - 4,5 - diethylcyclopentyl alcohol, 4 - amino - 5 - methyl - 2 - cyclohexenyl alcohol, and the like.

The aromatic polycarboxylic acid polyhalides suitable for use in preparing the novel compositions of this invention include those having from 8 to 20 carbon atoms. Illustrative compounds include, among others, the halides of phthalic acid, terephthalic acid, isophthalic acid, p-phenylenediacetic acid, p-phenylenedipropionic acid, 2,7-naphthalenediacetic acid, o-methyl-p-phenylenediacetic acid, o-propyl-phenylenediacetic acid, and the like. Acid halides other than the chloride can be employed but inasmuch as the hydroxy amine salt is preferably utilized as the chloride, the common chloride anion is preferred.

The following examples are illustrative:

EXAMPLE I

Bis(2-aminoethyl) terephthalate dihydrochloride

A stirred mixture of terephthaloyl chloride (203 grams, 1.0 mole), monoethanolamine hydrochloride (195 grams, 2.0 moles), and 1,2,4-trichlorobenzene was maintained at 121–125° C. for a period of nine hours. The solvent was removed from the resultant mixture and the crude solid product then washed with ether and methanol. The dried product (143 grams) represented 44 percent of the theoretical value and had a melting point of 242–244° C. Upon analysis the product had the following properties—Calculated for $C_{12}H_{18}N_2O_4Cl_2$: C, 44.3; H, 5.54; N, 8.61; Cl, 21.82. Found: C, 44.17; H, 5.61; N, 8.08; Cl, 21.24. Infrared spectrum was in agreement with that of the assigned structure with maxima at $3.4\mu$, $3.67\mu$, $3.77\mu$, $3.98\mu$, and $4.9\mu$ ($NH_3^+$); $5.83\mu$ (C=O); $6.25\mu$ and $6.63\mu$ ($C_6H_5CH=C$); $7.90\mu$ (C—O); $13.6\mu$ and $18.8\mu$ (terephthalate).

EXAMPLE II

Bis(2-aminoethyl) isophthalate dihydrochloride

A mixture of isophthaloyl chloride (122 grams, 0.6 mole), monoethanolamine hydrochloride (126 grams, 1.3 moles), and toluene (612 grams) was stirred for a period of 23 hours with the temperature of the mixture being maintained at 100–110° C. The resulting solid product was isolated by filtration, washed with ether and methanol, and dried. The refined product was obtained in 43 percent yield (84 grams) and had a melting range of 205–212° C. Upon analysis the product had the following properties—Calculated for $C_{12}H_{18}N_2O_4Cl_2$: N, 8.62; Cl, 21.85. Found: N, 8.71; Cl, 21.79. Infrared spectrum was in agreement with that of the assigned structure with maxima at $3.35\mu$, $3.75\mu$, $3.84\mu$, $3.97\mu$, and $5.0\mu$ ($NH_3^+$); $5.8\mu$ (conj. ester C=O); $6.22\mu$ and $6.7\mu$ (aromatic C=C+$NH_3^+$); and $7.7\mu$ and $8.1\mu$ (ester C—O).

Upon basification of the bis(2-aminoethyl) isophthalate dihydrochloride, the free ester diamine is obtained.

EXAMPLE III

Bis(2-aminoethyl) p-phenylenediacetate dihydrochloride

A mixture of p-phenylenediacetyl chloride (40 grams, 0.175 mole), monoethanolamine hydrochloride (32.6 grams, 0.35 mole), and toluene (109 grams) was stirred at 85–90° C. until no further evolution of HCl was detected (7 hours). The resulting solid product was isolated by filtration and washed with ethyl ether and methanol. The dried product (51 grams) represented 85 percent of the theoretical value and had a melting point of 212–213° C. Upon analysis the product had the following properties—Calculated for $C_{14}H_{22}N_2O_4Cl_2$: C, 47.6; H, 6.2; N, 7.94. Found: C, 47.3; H, 6.1; N, 7.7.

Upon basification of the bis(2-aminoethyl) p-phenylenediacetate dihydrochloride, the free ester diamine is obtained.

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. A diamine of the formula:

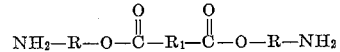

wherein R represents a divalent aliphatic hydrocarbon group of from 2 to 12 carbon atoms and $R_1$ represents a divalent member selected from the group consisting of arylene, arylenealkylene alkylenearylene, alkylenearylenealkylene and alkarylene of from 6 to 18 carbon atoms.

2. A diamine of the formula:

wherein $R_2$ represents an alkylene group of from 2 to 12 carbon atoms and $R_1$ represents an arylene group of from 6 to 18 carbon atoms.

3. A diamine of the formula:

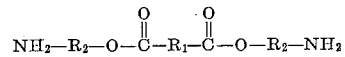

wherein $R_2$ represents an alkylene group of from 2 to 12 carbon atoms and $R_1$ represents an alkylenearylenealkylene group of from 6 to 18 carbon atoms.

4. A diamine of the formula:

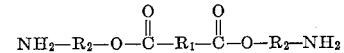

wherein $R_2$ represents an alkenylene group of from 2 to 12 carbon atoms and $R_1$ represents an arylene group of from 6 to 18 carbon atoms.

5. A diamine of the formula:

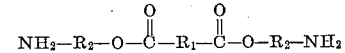

wherein $R_2$ represents an alkenylene group of from 2 to 12 carbon atoms and $R_1$ represents an alkylenearylenealkylene group of from 6 to 18 carbon atoms.

6. A diamine of the formula:

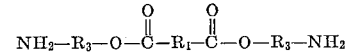

wherein $R_3$ represents a divalent cycloaliphatic hydrocarbon group of from 4 to 12 carbon atoms; and $R_1$ represents a divalent member selected from the group consisting of arylene, arylenealkylene, alkylenearylene, alkylenearylenealkylene and alkarylene of from 6 to 18 carbon atoms.

7. A diamine of the formula:

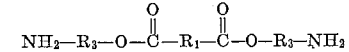

wherein $R_3$ represents a cycloalkylene group of from 4 to 12 carbon atoms and $R_1$ represents an arylene group of from 6 to 18 carbon atoms.

8. A diamine of the formula:

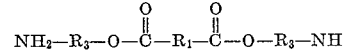

wherein $R_3$ represents a cycloalkylene group of from 4 to 12 carbon atoms and $R_1$ represents an alkylenearylenealkylene group of from 6 to 18 carbon atoms.

9. A diamine of the formula:

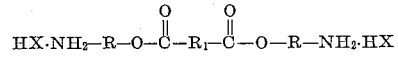

wherein R represents a divalent aliphatic hydrocarbon group of from 2 to 12 carbon atoms; $R_1$ represents a divalent member selected from the group consisting of arylene, arylenealkylene, alkylenearylene, alkylenearylenealkylene and alkarylene of from 6 to 18 carbon atoms; and HX represents a member selected from the group consisting of hydrogen chloride, hydrogen bromide, sulfuric acid and phosphoric acids.

10. Bis(2-aminoethyl) terephthalate.
11. Bis(2-aminoethyl) isophthalate.
12. Bis(2-aminoethyl) p-phenylenediacetate.

13. Bis(2-aminoethyl) terephthalate dihydrochloride.
14. Bis(2-aminoethyl) isophthalate dihydrochloride.
15. Bis(2-aminoethyl) p-phenylenediacetate dihydrochloride.

References Cited by the Examiner

UNITED STATES PATENTS

| | | | |
|---|---|---|---|
| 2,094,608 | 10/1937 | Kritchevsky | 260—475 |
| 2,687,414 | 8/1954 | Cusic | 260—243 |

FOREIGN PATENTS

| | | |
|---|---|---|
| 371,046 | 3/1923 | Germany. |
| 835,891 | 5/1960 | Great Britain. |

OTHER REFERENCES

Cope et al.: J. Am. Chem. Soc., vol. 66, pages 1448–53 (1944).

Mndzhoyan et al.: Chem. Abstracts, volume 50, page 15462c (1956).

LORRAINE A. WEINBERGER, *Primary Examiner.*

DUVAL T. McCUTCHEN, DANIEL D. HORWITZ,
*Examiners.*

T. L. GALLOWAY, A. D. ROLLINS, R. E. MASSA,
*Assistant Examiners.*